US009084166B1

(12) United States Patent
Vargantwar et al.

(10) Patent No.: US 9,084,166 B1
(45) Date of Patent: Jul. 14, 2015

(54) MANAGING CODEC CONSISTENCY ACROSS A COMMUNICATION SESSION

(75) Inventors: Sachin R. Vargantwar, Macon, GA (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 13/595,668

(22) Filed: Aug. 27, 2012

(51) Int. Cl.
*H04L 12/26* (2006.01)
*H04W 36/14* (2009.01)
*H04W 28/02* (2009.01)

(52) U.S. Cl.
CPC .......... *H04W 36/14* (2013.01); *H04W 28/0284* (2013.01)

(58) Field of Classification Search
CPC ............ H04W 36/14; H04W 28/0289; H04W 28/0284
USPC ............................ 370/252, 328, 465; 455/453
See application file for complete search history.

(56) References Cited

U.S. PATENT DOCUMENTS

| 6,069,883 | A | 5/2000 | Ejzak et al. |
| 6,088,335 | A | 7/2000 | I et al. |
| 6,349,208 | B1 | 2/2002 | Sexton et al. |
| 6,584,098 | B1 | 6/2003 | Dutnall |
| 6,665,538 | B1 | 12/2003 | Hunte |
| 6,798,786 | B1 | 9/2004 | Lo et al. |
| 7,031,703 | B1 | 4/2006 | Graf et al. |
| 7,120,447 | B1 | 10/2006 | Chheda et al. |
| 7,200,171 | B2 | 4/2007 | Forbes et al. |
| 7,254,121 | B2 | 8/2007 | Kim et al. |
| 7,328,027 | B1 * | 2/2008 | Mangal .......................... 455/453 |
| 7,668,134 | B2 | 2/2010 | Hosein et al. |
| 7,688,745 | B1 | 3/2010 | Hurtta et al. |
| 7,738,427 | B1 | 6/2010 | Yew et al. |
| 7,924,764 | B2 | 4/2011 | Moorti et al. |
| 8,107,961 | B1 | 1/2012 | Vargantwar et al. |
| 8,160,611 | B1 | 4/2012 | Oroskar |
| 8,213,953 | B1 | 7/2012 | Mangal |
| 8,254,930 | B1 | 8/2012 | Mauer et al. |
| 8,442,012 | B1 | 5/2013 | Singh et al. |

(Continued)

OTHER PUBLICATIONS

Unpublished U.S. Appl. No. 13/647,536, entitled "Coordination of Codec Assignment and radio Configuration in Wireless Communications" filed Oct. 9, 2012 in the name of Siddharth S. Oroskar.

(Continued)

*Primary Examiner* — Wei Zhao
*Assistant Examiner* — Lionel Preval

(57) ABSTRACT

A method and system is disclosed for maintaining codec consistency across a communication session. When a communication session is set up for an access terminal (AT) operating in a wireless communication system, a network device, such a base station, can determine a coding rate to assign the AT for its air interface in a manner that accounts for network capacity variations spatially and/or temporally across the session. If the requested communication session is determined to be with a landline device, then a higher coding rate may be used than might otherwise be selected. If the requested session is with another AT, then a coding rate that best accommodates the air interfaces of both ATs may be used. If the AT is predicted to handoff to multiple sectors during the session, then a coding rate that best accommodates the air interfaces of all the predicted handoff sectors may be used.

27 Claims, 6 Drawing Sheets

(56) References Cited

U.S. PATENT DOCUMENTS

| | | |
|---|---|---|
| 8,457,069 B1 | 6/2013 | Vargantwar et al. |
| 8,457,633 B1 | 6/2013 | Oroskar |
| 8,483,699 B1 | 7/2013 | Oroskar |
| 8,644,178 B1 | 2/2014 | Oroskar |
| 2003/0007466 A1* | 1/2003 | Chen .......................... 370/328 |
| 2003/0031200 A1 | 2/2003 | Lehtimaki |
| 2003/0236909 A1 | 12/2003 | Chu |
| 2004/0037312 A1* | 2/2004 | Spear .......................... 370/465 |
| 2006/0182068 A1 | 8/2006 | Stopler |
| 2006/0280159 A1 | 12/2006 | Bi et al. |
| 2007/0058623 A1 | 3/2007 | Moorti et al. |
| 2009/0209300 A1 | 8/2009 | Furbeck |
| 2012/0020248 A1 | 1/2012 | Granlund et al. |
| 2012/0028642 A1 | 2/2012 | Schliwa-Bertling |
| 2012/0224561 A1 | 9/2012 | Fang et al. |
| 2012/0307921 A1 | 12/2012 | Ulmer-Moll et al. |
| 2013/0109387 A1 | 5/2013 | Tinnakornsrisuphap et al. |

OTHER PUBLICATIONS

Unpublished U.S. Appl. No. 13/595,632, entitled "Maintaining Codec Consistency Across a Communication Session" filed Aug. 27, 2012 in the name of Sachin R. Vargantwar.

Unpublished U.S. Appl. No. 13/626,497, entitled "Managing Codec Consistency Across a Communication Session" filed Sep. 25, 2012 in the name of Siddharth S. Oroskar.

Unpublished U.S. Appl. No. 13/852,349, entitled "Coodination of Codec Consistency Across Wireless Coverage Areas" filed Mar. 28, 2013 in the name of Siddharth S. Oroskar.

Unpublished U.S. Appl. No. 13/860,579, entitled Coordination of Codec Consistency Based on Cross-Carrier Assignment filed Apr. 11, 2013 in the name of Siddharth S. Oroskar.

* cited by examiner

MANAGING CODEC CONSISTENCY ACROSS A COMMUNICATION SESSION

CROSS-REFERENCE TO RELATED APPLICATIONS

This application is related to the following commonly owned application filed on the same date: "Maintaining Codec Consistency Across A Communication Session," naming Sachin R. Vargantwar, Siddharth S. Oroskar, and Anoop Goyal as co-inventors. The entirety of this other application is hereby incorporated by reference.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." Access terminals may be capable of communication with either or both protocols, and may further be capable of handing off between them, in addition to being able to hand off between various configurations of coverage areas.

OVERVIEW

Under IS-2000 (and other versions of CDMA) and IS-856, communications from the wireless communication system (or the "wireless network") to an access terminal are carried on a "forward link" of the air interface, and communications from an access terminal to a base station are carried on a "reverse link" of the air interface. For IS-2000, data sent on both the forward and reverse links are assembled into units called frames, which contain data encoded for transmission to or from the access terminal (and correspondingly, from or to the base station), and are transmitted at regular intervals (corresponding to a frame rate), typically 20 milliseconds in duration (although other transmission intervals can be used). The receiving entity (e.g., access terminal on the forward link, and the wireless network—or a network device therein—on the reverse link) decodes the encoded data in received frames to recover the original data.

Encoding typically involves compression of data from an input bit rate to an output bit rate, where the output bit rate usually requires reduced transmission bandwidth (or data storage space) compared with the input bit rate. The amount of compression achieved depends on the compression scheme or algorithm applied, including whether or not any information in the input data is lost or modified in the process (e.g., rendered in some form of analytic approximation in order to accommodate reduced "volume"). The decoding process essentially reverses the encoding process, including decompressing the compressed data. The fidelity of the recovered data to the original data depends, in part, on how well the compression-decompression scheme compensates for lost or modified information, as well as the ability of the scheme to correct for degradation due to imperfect transmission (e.g., errors, noise, etc.).

The implementation of an encoding-decoding algorithm is referred to as a "codec" (for coder/decoder), and usually takes the form of a device (e.g., a digital signal processor, or the like) and/or computer-executable instructions (e.g., software, firmware, etc.). Different codecs may implement different encoding-decoding schemes, including the ability to achieve different levels of compression and/or different degrees of protection against transmission errors, and a given codec may have different modes of operation that similarly accommodate different levels of compression and/or different degrees of protection against transmission errors. Codecs typically comply with one or another industry standard in order to help insure interoperability.

For example, CDMA 2000 Spread Spectrum Systems (also referred to as CDMA2000 1X) and CDMA 2000 Spread Spectrum Systems Revision E (also referred to as CDMA2000 1X Advanced) specify support for a family of codecs referred to under the umbrella of "Enhanced Variable Bitrate Codec," or "EVRC." More particularly, "EVRC-B" (and upgrade to EVRC) is a speech codec that defines eight levels of average data rates that may be selected for encoding on a forward link to, and/or a reverse link from, an access terminal engaging in a voice call. Generally, a higher the data rate requires higher transmission power, but provides the better the voice quality, and vice versa. The eight levels are referred to as "capacity operating points" or "COPs," and are labeled with parameter values 0 through 7, in order from highest to lowest average data rate. When a given call is set up, the RAN (or RAN element, such as a BSC) selects a COP value based on capacity utilization of the sector in which the access terminal is operating. The COP value may also be adjusted by the RAN as the access terminal moves between sectors that have differing capacity loading conditions.

While a low COP value (e.g., 0) can provide high voice quality during a portion of a voice call when capacity utilization supports higher average data rates, it may also be the case that a changing COP value in correspondence with changing capacity utilization in different cells or sectors visited by an AT during a call can result in changing voice quality that a user finds distracting or annoying. A conventional approach to addressing the change in voice quality due to changing COP values is to simply fix a COP value for the duration of a call, without regard to network loading conditions in the different cells or sectors. However, this may have a negative impact on network operations, especially if network load is high in any of the cells or sectors.

A related issue can arise in connection with the type of far-end client device with which an access terminal engages for a voice call (or more generally, a communication session). More particularly, the type of far-end client device and/or the type of end-link connection it has with the network can be a limiting factor in the data rate that can be supported during a voice call with the access terminal at the other end. For example, a landline phone with a landline connection to the network may be able to support a high data rate. But when the far-end client device is a mobile device, such as another AT, the data rate supported for a call may depend on the RF operating conditions of the other AT. For instance, if the other AT is in a lightly loaded sector, it may be able to support a higher data rate than if it is in a highly loaded sector.

However, under conventional operation, a COP value is selected for a given voice call for an access terminal without consideration of the data rates supported by the far-end client device (or its end-link connection to the network). As a result, an access terminal that is operating in a lightly loaded sector may be allocated and/or consume more transmission capacity (i.e., a low COP value) than it needs when engaging in a voice call with a far-end client device that cannot support the data rate accommodated by the allocated capacity. In this way, conventional operation can lead to wasted capacity.

The above examples illustrate how conventional assignment of COP values can result in inefficient, and potentially wasteful, use of transmission capacity on forward and/or reverse links with access terminals in a wireless communication system. While the particular examples are directed to voice calls, the principles apply more generally to communication sessions for carrying voice and/or other forms of data. Accordingly, it would be desirable to be able to maintain consistency of codecs across communication sessions, both spatially and temporally. By doing so, allocation of transmission capacity on forward and/or reverse links can be made in a manner that takes better account of system capacity and of near-end/far-end capacity coordination.

Hence in one respect, various embodiments of the present invention provide, in a radio access network (RAN) device of a wireless communication system, a method comprising: receiving a request to set up a communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone; determining that there is greater than a threshold likelihood that the communicative connection will also include a respective additional air interface in each of at least one additional wireless coverage zone of a wireless communication network; determining a respective transmission rate supported by the respective additional air interface in each of the at least one additional wireless coverage zones; selecting a coding rate for the particular air interface based on a comparison of the determined respective transmission rates and an air-interface transmission rate supported by the particular air interface; and transmitting an instruction to the access terminal to use the selected coding rate for air-interface communications for a duration of the communication session.

In another respect, various embodiments of the present invention provide, a radio access network (RAN) device of a wireless communication system comprising: one or more processors; memory accessible by the one or more processors; and computer-readable instructions stored in the memory that upon execution by the one or more processors cause the RAN device to carry out functions including: receiving a request to set up a communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone, determining that there is greater than a threshold likelihood that the communicative connection will also include a respective additional air interface in each of at least one additional wireless coverage zone of a wireless communication network, determining a respective transmission rate supported by the respective additional air interface in each of the at least one additional wireless coverage zones, selecting a coding rate for the particular air interface based on a comparison of the determined respective transmission rates and an air-interface transmission rate supported by the particular air interface, and transmitting an instruction to the access terminal to use the selected coding rate for air-interface communications for a duration of the communication session.

In yet another respect, various embodiments of the present invention provide, a non-transient computer-readable medium having instructions stored thereon that, upon execution by one or more processors of a radio access network (RAN) device of a wireless communication network, cause the RAN device to carry out functions including: receiving a request to set up a communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone; determining that there is greater than a threshold likelihood that the communicative connection will also include a respective additional air interface in each of at least one additional wireless coverage zone of a wireless communication network; determining a respective transmission rate supported by the respective additional air interface in each of the at least one additional wireless coverage zones; selecting a coding rate for the particular air interface based on a comparison of the determined respective transmission rates and an air-interface transmission rate supported by the particular air interface; and transmitting an instruction to the access terminal to use the selected coding rate for air-interface communications for a duration of the communication session.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments will be described by way of example with reference to Code Division Multiple Access ("CDMA") communications in general, and to IS-856 and IS-2000 (including CDMA2000 1X and CDMA2000 1X Advanced) communications in particular. As described below, IS-2000 applies to both circuit-cellular and packet-data communications, and is referred to herein as "conventional" CDMA communications. For voice communications, CDMA2000 1X and/or CDMA2000 1X Advanced may specify codec support according to EVRC, including EVRC-B, EVRC-WB, and EVRC-NW. IS-856 applies more exclusively to packet-data communications (including, e.g., real-time voice and data applications), and is referred to herein as "high rate" packet-data communications. It should be understood that example embodiments can apply to other wireless voice and data protocols including, without limitation, IS-95 and GSM, which, together with IS-856 and IS-2000 are considered herein, individually or in combination, to comprise a CDMA family of protocols.

Figure 1:
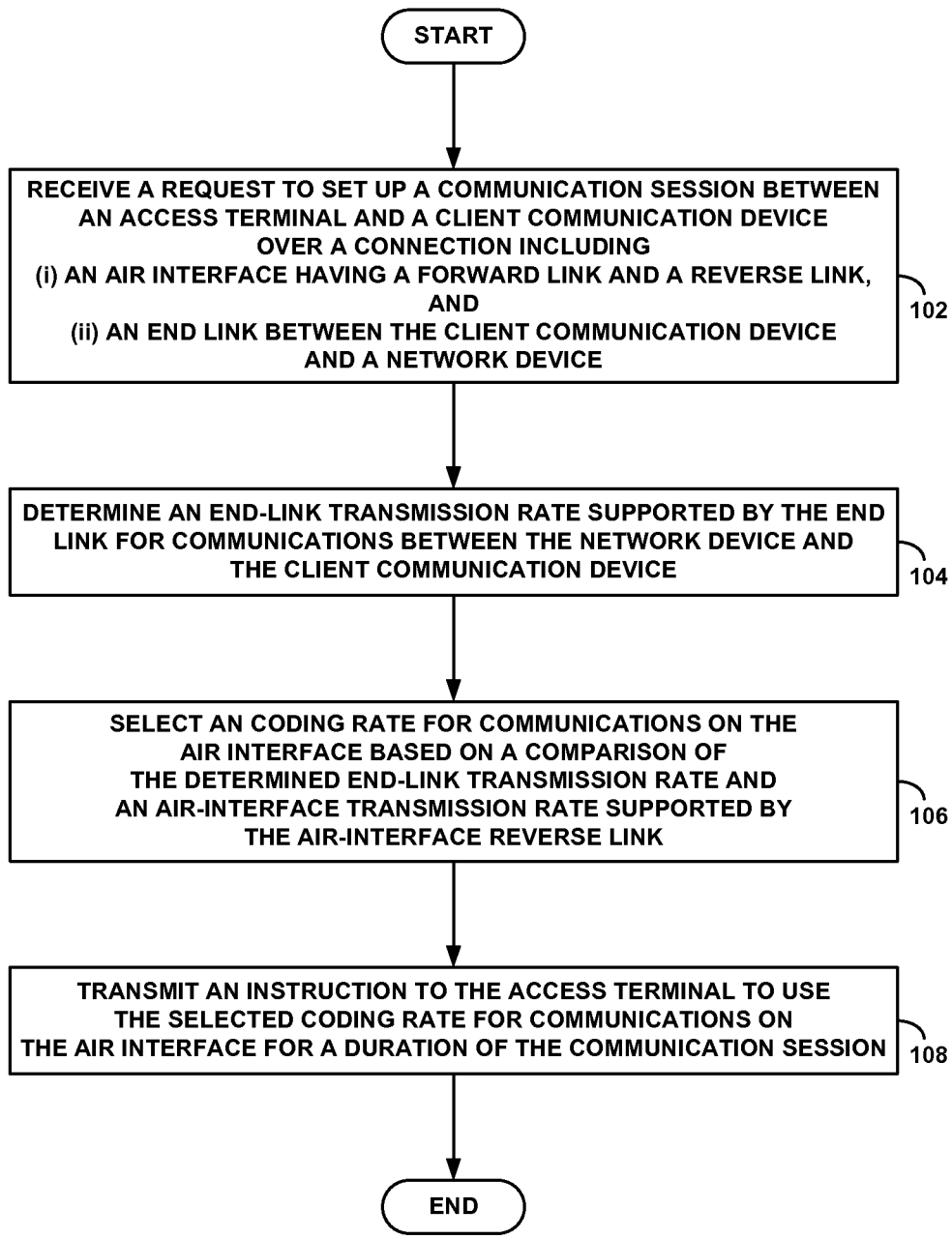
FIG. 1 is a flowchart illustrating an example method of maintaining codec consistency across a communication session, in accordance with a first embodiment.

FIG. 1 is a flowchart illustrating an example method of maintaining codec consistency across a communication session, in accordance with a first embodiment. In particular, the example method of FIG. 1 can account for aspects of end-to-end transmission capacity in codec selection. By way of example, the method could be carried out by a RAN device configured to operate according to a CDMA family of protocols, including at least CDMA2000 1X. The RAN device could be, for example, a base station, a BSC, or an MSC operating in a wireless communication system (or wireless communication network) that is also configured to operate according to a CDMA family of protocols.

At step 102, the RAN device receives a request to set up a communication session between an access terminal and a client communication device over a communicative connection that includes (i) a particular air interface having a particular forward link from the base station to the access terminal and a particular reverse link from the access terminal to the base station, and (ii) an end link between the client communication device and a network device communicatively connected with the RAN device. For example, an access terminal operating in a given sector (or other type of wireless coverage zone) of the wireless communication system could transmit a request to the base station (e.g., a BTS and/or BSC) of the given sector to set up a voice call (or other type of communication session) with the client communication device. Alternatively, the request could come from the client communication device. As described above, and further discussed below, communication to the access terminal from the base station may be carried on the particular forward link, and communication from the access terminal to the base station may be carried on the particular reverse link.

By way of example, the client communication device could be mobile device, such as another access terminal, operating in the same or a different wireless communication system or network. In this case, the network device could be another (or the same) base station, and the end link could also be an air interface. As another example, the client communication device could be a landline phone connected to a switch or other access device in a landline network. In this case, the network device could be the switch or access device in the landline network, and the end link could be a wireline connection.

Prior to receiving the request, there may not necessarily be an established communicative connection between the access terminal and the client communication device. Rather, the communicative connection may be established as part of the call (or session) set up. Whether pre-existing or established as part of the call (or session) set up, the communicative connection could include (or come to include) various segments. In particular, the segments could include the particular forward and reverse links between the access terminal and the base station, the end link between the client communication device and the network device, and one or more segments between the base station and the network device (if they are not the same device, e.g.).

At step 104, the RAN device determines an end-link transmission rate supported by the end link for communications between the network device and the client communication device. More particularly, as part of acting to establish the communicative connection between the access terminal and the client communication device, the RAN device may determine the nature of the end link, such as whether it is an air interface or a landline connection. In doing so, the RAN device may determine what rate or rates of transmission are supported by the end link for communication from the network device to the client communication device, as well as from the client communication device to the network device. For example, if the end link is a wireline (landline) connection, it may provide guaranteed or fixed capacity, and correspondingly a high data rate. Alternatively, if the end link is an air interface, its capacity may be subject to loading conditions or RF conditions at the time the call request at step 102 is received. In this case, the end-link transmission rate supported by the end link may correspondingly depend on loading conditions or RF conditions at the time of the call request.

At step 106, the RAN device selects a coding rate for communications on the particular air interface based on a comparison of the determined end-link transmission rate and an air-interface transmission rate supported by the particular air interface. In doing so, the RAN device helps to configure an operational correspondence between the rate at which data can be transmitted on the air inter face, and the rate at which data can be transmitted on the end link.

Finally, at step 108, the RAN device transmits an instruction to the access terminal to use the selected coding rate for communications with the base station on the particular air interface for a duration of the communication session. More specifically, the access terminal may transmit and receive on the particular air interface data rates determined, at least in part, by a selectable coding rate. For a given call or communication session, the coding rate may be selected by the RAN device, based on loading conditions and/or RF conditions current at the time the call request is received, for example. The access terminal's coding rate for a given call or communication session may therefore be set via a command or instruction from the base station (or other RAN device).

In accordance with example embodiments, the example method illustrated in FIG. 1 can be applied communications in either or both directions between the access terminal and the client communication device. More particularly, for communications from the access terminal to the client communication device, determining the end-link transmission rate supported by the end link for communications between the network device and the client communication device could correspond to determining a down-link transmission rate supported by the end link for communications from the network device to the client communication device. In this case, selecting the coding rate for communications on the particular air interface based on the comparison of the determined end-link transmission rate and the air-interface transmission rate supported by the particular air interface could correspond to selecting an encoding rate for communications from the access terminal to the base station on the particular reverse link based on a comparison of the determined down-link transmission rate and a reverse-link transmission rate supported by the particular reverse link. In addition, transmitting the instruction to the access terminal to use the selected coding rate for communications with the base station on the particular air interface could correspond to transmitting an instruction to the access terminal to use the selected encoding rate for communications to the base station on the particular reverse link.

Additionally or alternatively, for communications from the client communication device to the access terminal, determining the end-link transmission rate supported by the end link for communications between the network device and the client communication device could correspond to determining an up-link transmission rate supported by the end link for communications from the client communication device to the network device. In this case, selecting the coding rate for communications on the particular air interface based on the comparison of the determined end-link transmission rate and the air-interface transmission rate supported by the particular air interface could correspond to selecting a decoding rate for communications from the base station to the access terminal on the particular forward link based on a comparison of the determined up-link transmission rate and a forward-link transmission rate supported by the particular forward link. In addition, transmitting the instruction to the access terminal to use the selected coding rate for communications with the base station on the particular air interface could correspond to transmitting an instruction to the access terminal to use the selected decoding rate for communications from the base station on the particular forward link.

In accordance with example embodiments, the communication session may be a voice call, in which case determining (at step 104) the end-link transmission rate supported by the end link for communications between the network device and the client communication device could correspond to determining a voice codec and encoding rate that will be used to transmit encoded voice data between the network device and the client communication device during the voice call. For example, the RAN device may determine that the end link is a wireline connection, and further determine a voice codec and encoding rate, and hence a transmission rate, for voice data between the network device and the client communication device on the wireline connection.

As another example, the RAN device may determine that the end link is an air interface in a wireless coverage zone of a wireless communication network, and further determine a voice codec and encoding rate, and hence a transmission rate, for voice data between the network device and the client communication device on the air interface. In this case, the determination of the transmission rate on the air interface could correspond to determining a quality level of RF operating conditions in the wireless coverage zone. For example, the voice codec and encoding rate used on the air interface could depend, at least in part, on a level of RF interference and/or noise.

In accordance with example embodiments, selection of the encoder rate at step 106 could configure an operational correspondence between transmission rates on the particular air interface and the end link. More particularly, the RAN device could determine the air-interface transmission rate supported by the particular air interface. For example, the RAN device could determine capacity loading conditions and/or a quality level of radio-frequency (RF) operating conditions in the given sector (or other type of wireless coverage zone) in which the access terminal is operating. Then, by comparing the determined air-interface transmission rate with the end-link transmission rate determined at step 104, the RAN device could select a coding rate for the air interface that gives a close match between the air-interface transmission rate and the end-link transmission rate.

In further accordance with example embodiments, the RAN device could determine a "close match" between the air-interface transmission rate the end-link transmission rate by defining a rate value to be the maximum of the two transmission rates if they are within a threshold of being equal, or defining the rate value to be the minimum of the two if they are not within a threshold of being equal. For example the threshold could be set as a relative fractional or a percentage difference between the two rates (e.g., 0.1 or 10%). Then the RAN device could select a coding rate that corresponds to the defined rate value. In practice, the coding rate could be implemented according to a plurality of predefined coding rates, and the RAN device could select a predefined coding rate from among the plurality that most closely yields the defined rate value. As discussed in connection with step 108, the coding rate selected in this manner by the RAN device could be used by the access terminal for transmitting and/or receiving on the air interface during the communication session.

In accordance with example embodiments in which the wireless communication system is configured to operate according to CDMA2000 1X and/or CDMA2000 1X Advanced with codec support according to EVRC, including at least EVRC-B, air-interface coding rates may be assigned according to predefined Capacity Operating Point (COP) parameter values. Under EVRC-B, COP parameter values may be defined in a range from a minimum COPs value to a maximum COPs value, where each COP parameter value is associated with a different coding rate. Larger COP parameter values are associated with smaller coding rates, and vice versa. For example, eight integer COP parameter values ranging from 0, ..., 7 may be defined to specify coding rates that yield average data rates ranging from 6.93 kilobits per second (kbps) down to 3.75 kbps.

In further accordance with example embodiments, the RAN device could select the coding rate (at step 106) by determining a default COP parameter value for the air interface based on capacity load conditions in the access terminal's wireless sector and according to EVRC-B specifications, and then adjusting the default COP parameter value based on the end-link transmission rate and on a predicted and/or expected trend for capacity load in the access terminal's wireless sector. More particularly, if the end link is determined to be a wireline connection, the end link may be able to accommodate a high data transmission rate. In addition, if a trend for capacity load in the access terminal's wireless sector is predicted to increase at no greater than a threshold rate, the sector may be able to accommodate an air-interface transmission rate higher than the rate associated with the default COP parameter value. In this case, RAN device could select a COP parameter value that is one less than the determined default COP parameter value, so long as the default value is not already equal to the minimum COPs value.

If instead, the trend for capacity load in the access terminal's wireless sector is predicted to increase at greater than a threshold rate, the sector may not be able to accommodate an air-interface transmission rate higher than the rate associated with the default COP parameter value. In this case, RAN device could just keep the determined default COP parameter value.

If the end link is determined to be an air interface in a wireless sector of a wireless communication network, the RAN device could determine the end-link transmission rate according to a COP parameter value for the end link. Then the RAN could select a COP parameter value for the access terminal's air interface that is a maximum of the determined default COP parameter value and the determined end-link COP parameter value. This could help ensure that the access terminal's air-interface transmission rate is no greater than a rate that both the access terminal's air interface and the end link can accommodate.

In still further accordance with example embodiments, historical loading data for a sector, as well as current conditions in the sector, could be used to predict a trend for capacity load in the sector.

Figure 2:
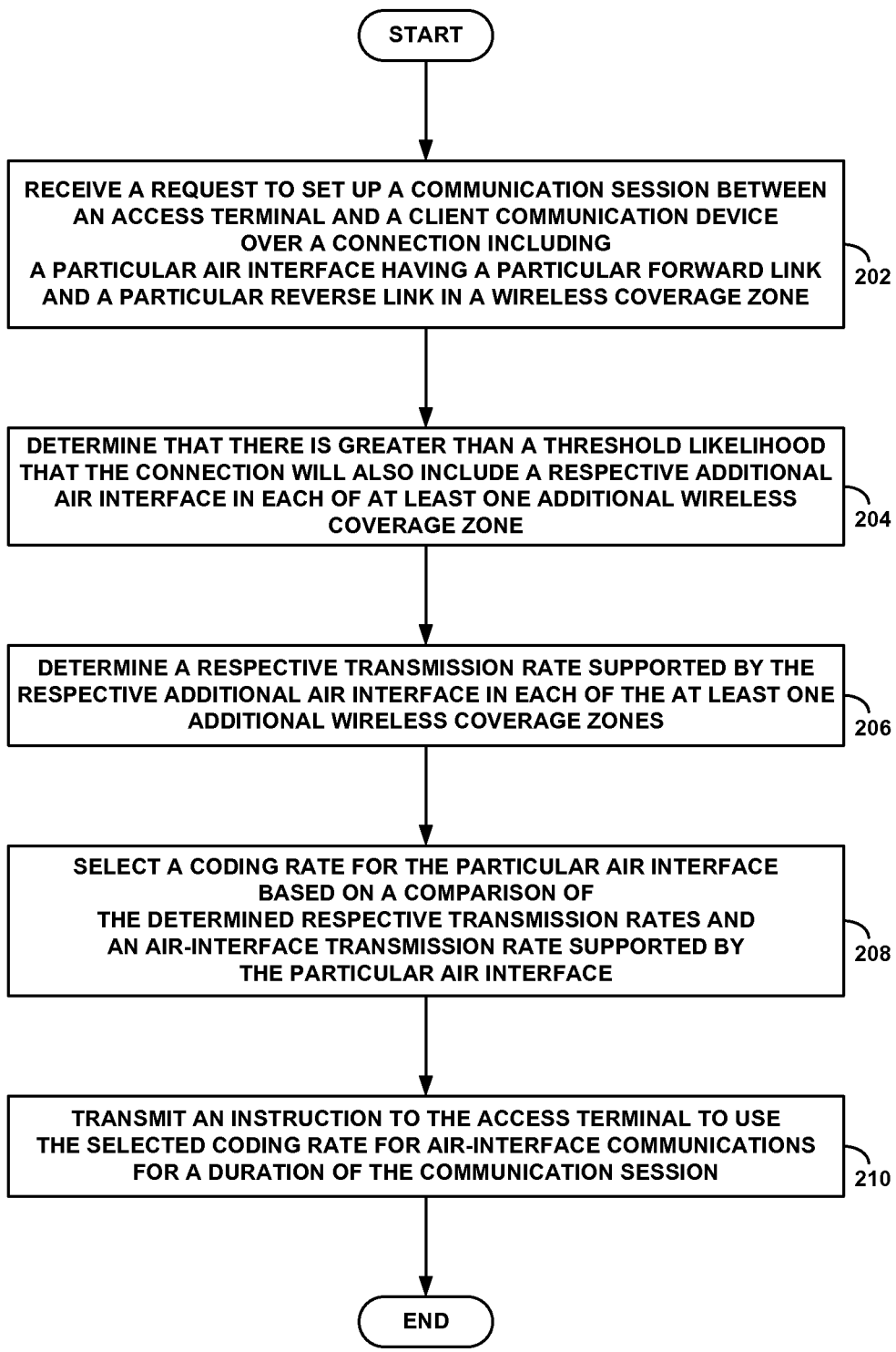
FIG. 2 is a flowchart illustrating an example method of maintaining codec consistency across a communication session, in accordance with a second embodiment.

FIG. 2 is a flowchart illustrating an example method of maintaining codec consistency across a communication session, in accordance with a second embodiment. In particular, the example method of FIG. 2 can account for access terminal mobility considerations in codec selection. Again by way of example, the method could be carried out by a RAN device configured to operate according to a CDMA family of protocols, including at least CDMA2000 1X. The RAN device could be, for example, a base station, a BSC, or an MSC operating in a wireless communication system (or wireless communication network) that is also configured to operate according to a CDMA family of protocols.

At step 202, the RAN device receives a request to set up a communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone. For example, an access terminal operating in the particular wireless coverage area (such as a wireless sector) could transmit a request to a base station (e.g., a BTS and/or BSC) of the particular wireless coverage area to set up a voice call (or other type of communication session) with the client communication device. Alternatively, the request could come from the client communication device. As described above, and further discussed below, communication from the base station to the access terminal may be carried on the particular forward link, and communication from the access terminal to the base station may be carried on the particular reverse link.

By way of example, the client communication device could be mobile device, such as another access terminal, operating in the same or a different wireless communication system or network. As another example, the client communication device could be a landline phone connected to a switch or other access device in a landline network.

Prior to receiving the request, there may not necessarily be an established communicative connection between the access terminal and the client communication device. Rather, the communicative connection may be established as part of the call (or session) set up. Whether pre-existing or established as part of the call (or session) set up, the communicative connection could include (or come to include) various segments. In particular, the segments could include the particular forward link and the particular air-interface reverse link, among other possible links.

At step 204, the RAN device determines that there is greater than a threshold likelihood that the communicative connection will also include a respective additional air interface in each of at least one additional wireless coverage zone of a wireless communication network. More particularly, the RAN device may determine or predict that there is greater than the threshold likelihood that the access terminal will hand off to at least one wireless coverage zones, besides the particular wireless coverage zone, during the communication session. Further, the determination or prediction of handoff may include identification of each wireless coverage area that is a likely handoff target. For each such handoff, the access terminal would use a different air interface, so the likelihood of handoffs can correspond to a likelihood that the communicative connection will also include additional air interfaces during the communication session. By way of example, the threshold likelihood could be a percentage or fractional confidence level, such as 80% or 0.8. Other threshold likelihoods values could be used as well.

At step 206, the RAN device determines a respective transmission rate supported by the respective additional air interface in each of the at least one additional wireless coverage zones. More specifically, the RAN device may determine likely target wireless coverage zones of predicted handoffs. In doing so, the RAN device may determine what rate or rates of transmission are supported by respective air interfaces in each of likely target wireless coverage zone.

At step 208, the RAN device selects a coding rate for the particular air interface based on a comparison of the determined respective transmission rates and an air-interface transmission rate supported by the particular air interface. In doing so, the RAN device helps to configure an air-interface transmission rate that can remain consistent over the course of the communication session, even as the access terminal hands off across wireless coverage zones with a likelihood that exceeds a threshold.

Finally, at step 210, the RAN device transmits an instruction to the access terminal to use the selected coding rate for air-interface communications for a duration of the communication session. More specifically, the access terminal may transmit and receive data on its air interface at a data rate determined, at least in part, by a selectable coding rate. For a given call or communication session, the coding rate may be selected by the RAN device, based on loading conditions and/or RF conditions current at the time the call request is received, for example. The access terminal's coding rate for a given call or communication session may therefore be set via a command or instruction from the base station (or other RAN device).

In accordance with example embodiments, the example method illustrated in FIG. 2 can be applied communications in either or both directions between the access terminal and the client communication device. More particularly, for communications from the access terminal to the client communication device, determining the respective transmission rate supported by the respective additional air interface in each of the at least one additional wireless coverage zones could correspond to determining a respective reverse-link transmission rate supported by the respective additional air interface in each of the at least one additional wireless coverage zones. In this case, selecting the coding rate for the particular air interface based on the comparison of the determined respective transmission rates and the air-interface transmission rate supported by the particular air interface could correspond to selecting an encoding rate for the particular reverse link based on a comparison of the determined respective reverse-link transmission rates a reverse-link transmission rate supported by the particular reverse link. In addition, transmitting the instruction to the access terminal to use the selected coding rate for air-interface communications could correspond to transmitting an instruction to the access terminal to use the selected encoding rate for communications on the particular reverse link.

Additionally or alternatively, for communications from the client communication device to the access terminal, determining the respective transmission rate supported by the respective additional air interface in each of the at least one additional wireless coverage zones could correspond to determining a respective forward-link transmission rate supported by the respective additional air interface in each of the at least one additional wireless coverage zones. In this case, selecting the coding rate for the particular air interface based on the comparison of the determined respective transmission rates and the air-interface transmission rate supported by the particular air interface could correspond to selecting a decoding rate for the particular forward link based on a comparison of the determined respective forward-link transmission rates a forward-link transmission rate supported by the particular forward link. In addition, transmitting the instruction to the access terminal to use the selected coding rate for air-interface communications could correspond to transmitting an instruction to the access terminal to use the selected decoding rate for communications on the particular forward link.

In accordance with example embodiments, the communication session may be a voice call, and determining (at step 206) the respective transmission rate supported by each respective additional air interface could correspond to determining a voice codec and encoding rate that will be used on the respective additional air interface in each of additional wireless coverage zones during the voice call. For example, the voice codec and encoding rate used on each respective air interface could depend, at least in part, on a level of RF interference, noise, and/or capacity loading in the corresponding wireless coverage zone. The determination of the transmission rate supported on each respective additional air interface could thus correspond to determining a quality level of RF operating conditions in of the additional wireless coverage zones.

Also in accordance with example embodiments, selection of the coding rate at step 208 could configure an operational correspondence between transmission rates on the particular air interface and the respective air interface in each of the one or more additional wireless coverage zones. For example, the RAN device could determine capacity loading conditions and/or a quality level of radio-frequency (RF) operating in conditions the particular sector (or other type of wireless coverage zone) in which the access terminal is operating. Then, by comparing the determined air-interface transmission rate for the particular air interface with the respective transmission rates supported by the respective additional air interfaces determined at step 206, the RAN device could select a coding rate for the particular air interface that is well-matched to all the supported transmission rates likely to be encountered during the communication session.

In further accordance with example embodiments, the RAN device could determine a "well-matched" coding rate by first determining a minimum rate value from among the determined air-interface transmission rate supported by the particular air interface and the determined respective transmission rates supported by the respective additional air interfaces. Next, from among all the determined air-interface transmission rates, the RAN device could determine a particular rate value that is a maximum of all those rate values that are no greater than a given threshold above the determined minimum rate value. By way of example, the threshold could be set as a relative fractional or a percentage difference between the rate values (e.g., 0.1 or 10%). Finally, the RAN device could select a coding rate that corresponds to the particular rate value. In practice, the coding rate could be implemented according to a plurality of predefined coding rates, and the RAN device could select a predefined coding rate from among the plurality that most closely yields the defined rate value. This approach could help ensure that the selected is as large as possible, but without unduly exceeding a rate supported by the slowest of the air interfaces likely to be encountered during the communication session. That is, the slowest rate need not necessarily be a strict upper limit, but it may at least set an approximate or target bound. As discussed in connection with step 210, the coding rate selected in this manner by the RAN device would be used by the access terminal for transmitting and receiving on the air interfaces during the communication session.

In accordance with example embodiments in which the wireless communication system is configured to operate according to CDMA2000 1X and/or CDMA2000 1X Advanced with codec support according to EVRC, including at least EVRC-B, air-interface coding rates may be assigned according to predefined Capacity Operating Point (COP) parameter values. In keeping with the example discussed above, EVRC-B may define eight integer COP parameter values ranging from 0, ..., 7 specifying coding rates that yield average data rates ranging from 6.93 kilobits per second (kbps) down to 3.75 kbps.

In further accordance with example embodiments, the RAN device could select the coding rate (at step 208) by determining a default COP parameter value for the particular air interface based on capacity load conditions in the particular wireless sector and according to EVRC-B specifications, and then adjusting the default COP parameter value based on a comparison respective COP values determined for the additional air interfaces. More specifically, the RAN device may determine a respective COP parameter value for the access terminal's respective additional air interface in each of the one or more additional wireless coverage zones. For example, the RAN device could communicate with a respective base station in each of the one or more additional sectors (or other form of coverage area) to which the access terminal is predicted to hand off during the call session. The RAN device could then select a COP parameter value that is a maximum from among the determined default COP parameter value and the determined respective COP parameter values. This could help ensure that the access terminal's air-interface transmission rate is no greater than a rate that all of the air interfaces likely to be encountered during the call session can accommodate.

In accordance with example embodiments, the RAN device could determine that there is greater than the threshold likelihood that the communicative connection will also include the respective additional air interface reverse link in each of the at least one additional wireless coverage zones of the wireless communication network by analyzing historical records of previous communication sessions of the access terminal. More particularly, the RAN device could apply such an analysis to probabilistically determine a set of one or more wireless coverage zones, besides the particular wireless coverage zone, to which the access terminal is predicted to hand-off during the communication session. For example, the wireless communication system could maintain call detail records (CDRs) for the access terminal (or for a subscriber account associated with the access terminal, for instance). Such CDRs could include historical records of previous voice calls to and from the access terminal. Analysis of CDRs could reveal patterns of movement of the access terminal having degrees of temporal repetition from which predicted movement may be determined. For example, a given access terminal may be observed to engage in the same apparent call session at the same approximate time each day. Other predictable call characteristics based on historical records may be determined as well.

It will be appreciated that the steps of both FIG. 1 and FIG. 2 are presented by way of example, and that additional and/or alternative steps or alternative ordering of steps could be carried out and still remain within the scope and spirit of the embodiments herein.

Figure 3:
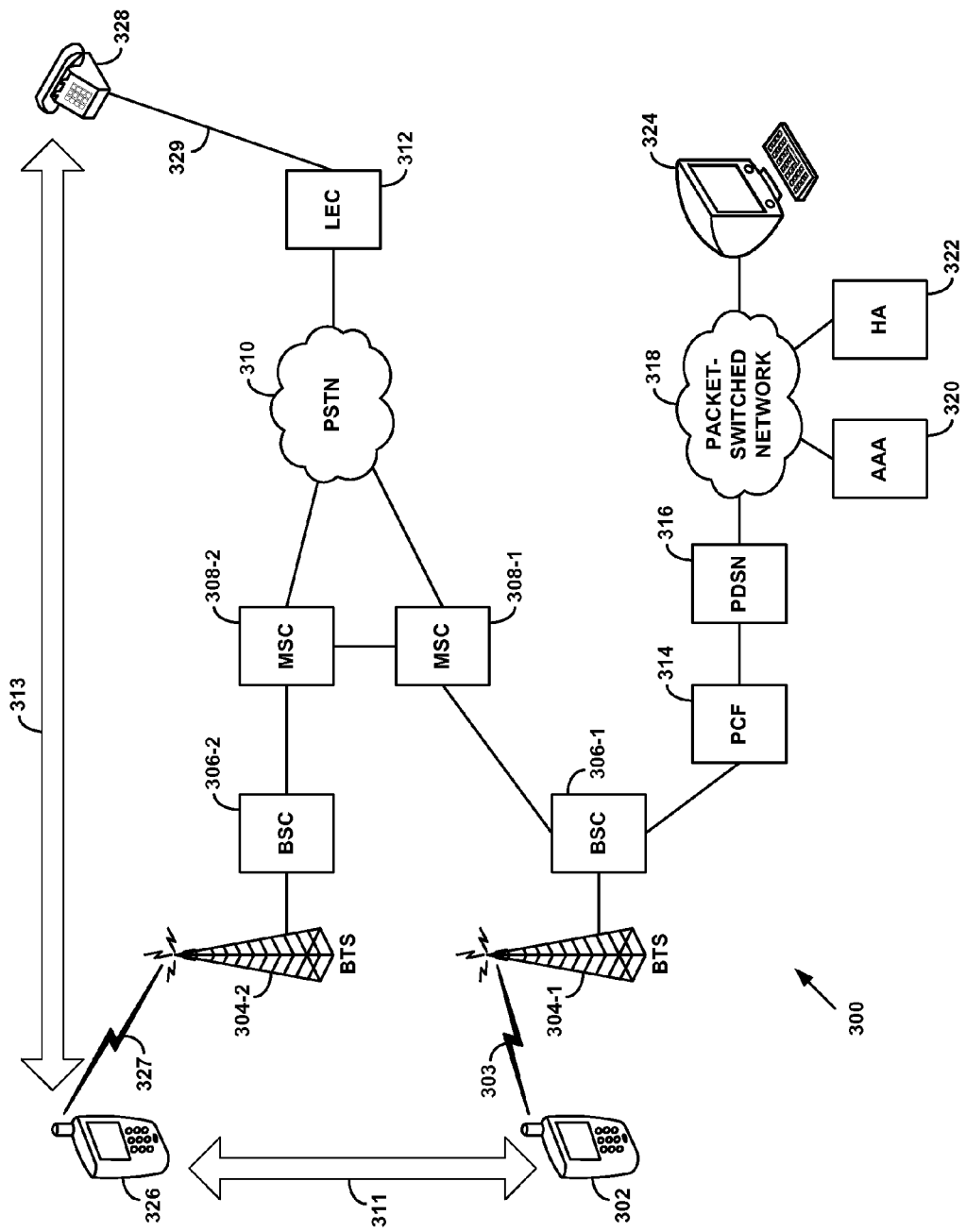
FIG. 3 is a simplified block diagram of a wireless communication system in which example embodiments of maintaining codec consistency across a communication session can be employed.

FIG. 3 shows a simplified block diagram of a wireless communication system 300 in which example embodiments of maintaining codec consistency across a communication session could be employed. Access terminal AT 302 communicates over an air interface 303 with a BTS 304-1, which is then coupled or integrated with a BSC 306-1. Transmissions over air interface 303 from BTS 304-1 to AT 302 represent the forward link to the access terminal (also referred to herein alternatively as the forward link from the base station, and as "the AT's forward link"). Transmissions over interface 303 from AT 302 to BTS 304-1 represent the "reverse link" (also referred to herein as "the AT's reverse link") It will be appreciated that the arrangement shown in the figure is illustrative.

The BSC 306-1 is connected to MSC 308-1, which acts to control assignment of air traffic channels (e.g., over air interface 303), and provides access to wireless circuit-switched services such as circuit-voice and circuit-data (e.g., modem-based packet data) service. By way of example, the MSC 308-1 is shown as being connected to a second MSC region represented in the figure by the MSC 308-2, the BSC 306-2, and the BTS 304-2. Support for user mobility across MSC regions, as well as communications between AT in different MSC regions, is represented by the connection shown between the MSC 308-1 and 308-2. As represented by their respective connections to PSTN 310, MSCs 308-1 and 308-2 are also coupled with one or more telephony circuit switches, such as the Local Exchange Carrier (LEC) switch 312 in the operator's (or in a different operator's) network. The LEC 312 (or other form of landline switch) may support connectivity to landline subscribers, such as is represented by landline phone 328 connected via the end link 329.

As shown, BSC 306-1 is also connected with a PDSN 316 by way of packet control function (PCF) 314. PDSN 316 in turn provides connectivity with a packet-switched network 318, such as the Internet and/or a wireless carrier's private core packet-network. Sitting as nodes on network 318 are, by way of example, an authentication, authorization, and accounting (AAA) server 320, a mobile-IP home agent (HA) 322, and a remote computer 324. After acquiring an air traffic channel over its air interface, an access terminal (e.g., AT 302) may send a request to PDSN 316 for a connection in the packet data network. Then, following authentication of the access terminal by AAA server 320, the access terminal may be assigned an IP address by the PDSN or by HA 322, and may thereafter engage in packet-data communications with entities such as remote computer 324. Although not necessarily shown explicitly in FIG. 3, the BSC 308-2 may also provide a packet data connection to a packet switch network, such the network 318, for packet-data services.

It should be understood that the depiction of just one (or two) of each network element in FIG. 3 is illustrative, and there could be more than one (or two) of any of them, as well as other types of elements not shown. The particular arrangement shown in FIG. 3 should not be viewed as limiting with respect to the embodiments herein. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a transceiver, a communication interface, a tone detector, a processing unit, and data storage, all of which may be coupled together by a system bus or other mechanism. As such, system 300, ATs 302 and 326, air interfaces 303 and 327, landline phone 328, and end link 329 are representative of exemplary means of implementing and carrying out the various functions, steps, and procedures described herein.

Figure 4:
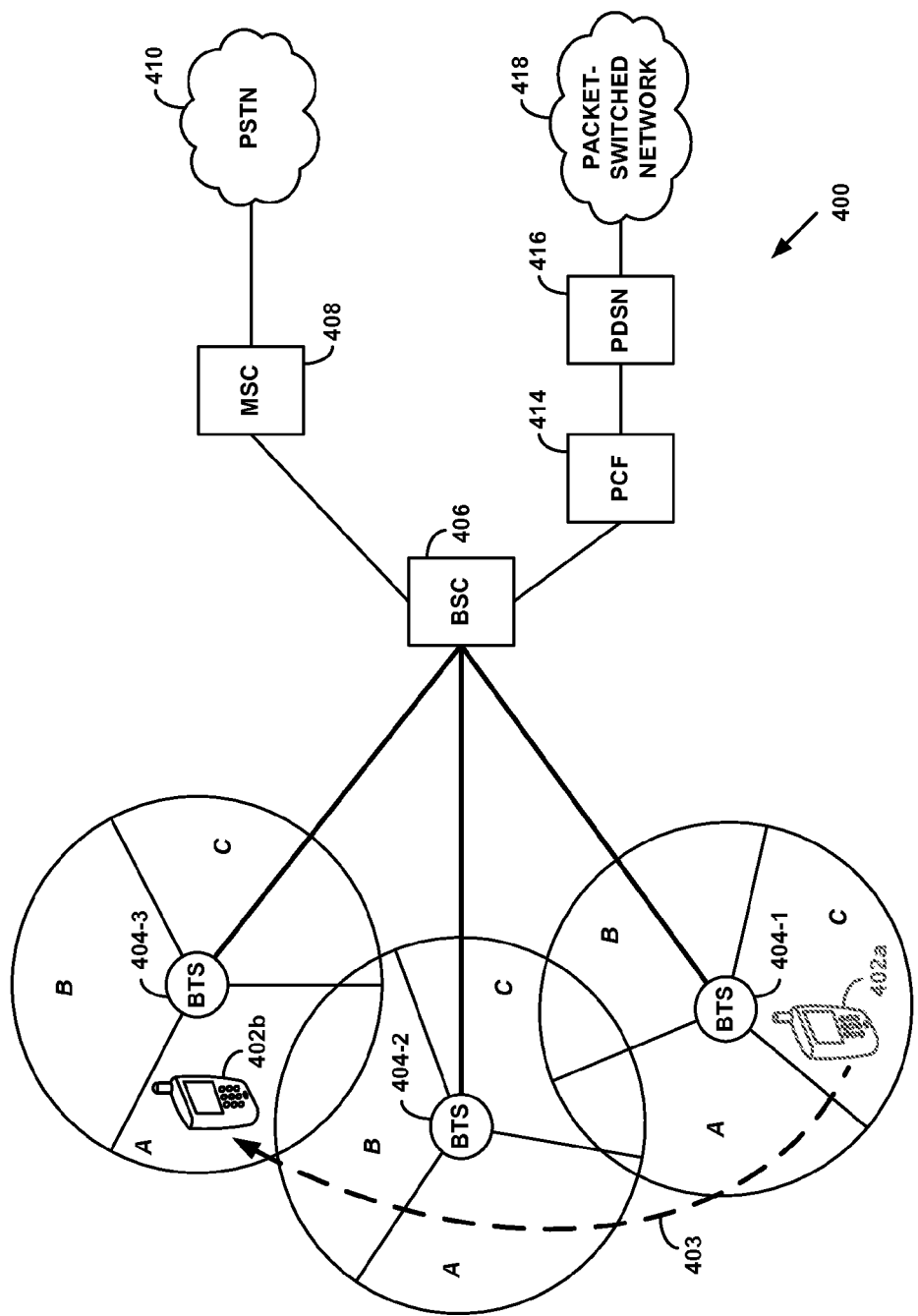
FIG. 4 illustrates a first example of operation of maintaining codec consistency across a communication session in a wireless communication system, in accordance with example embodiments.

In practice, a BSC, such as the BSCs 306-1 and 306-2 may serve multiple BTSs, each of which may then radiate to define a given cell and a plurality of cell sectors. This arrangement is illustrated in FIG. 4, which shows BSC 406 in network 400 coupled with three BTSs 404-1, 404-2, and 404-3. Each BTS is shown at the core of a respective circle representing a cell, and each cell is divided into three pie-pieces, labeled "A," "B," and "C," representing wireless service sectors. With this arrangement, an access terminal can operate in any of the sectors and can connect, via a serving BTS, with a MSC 408 for circuit-based services in the wireless communication system and beyond (e.g., in PSTN 410). Through its serving sector, an access terminal can also communicate, via PCF 414 and PDSN 416, on packet network 418. Note that the depiction of three wireless services sectors for each of the BTSs in FIG. 4 is by way of example, and other numbers of sectors per BTS are possible. Further, the relative positions of the BTSs and the relative angular orientations of the wireless service sectors are also illustrative, and other arrangements may be used. As discussed below, FIG. 4 also illustrates a first example of operation of maintaining codec consistency across a communication session in a wireless communication system, in accordance with example embodiments.

Throughout this description, the term "base station" will be used to refer to a Radio Access Network (RAN) element or RAN device such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code.

On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

With arrangement described above, an access terminal can engage in cellular voice or packet-data communications. Referring again to FIG. 3, and taking an originating call from AT 302 as an example, AT 302 first sends an origination request over air interface 303 and via the BTS 304-1 and BSC 306-1 to MSC 308-1. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal).

For a packet-data session, the BSC 306-1 signals to the PDSN 316 by way of PCF 314. The PDSN 316 and access terminal 302 then negotiate to establish a data link layer connection, such as a point to point protocol (PPP) session. Further, the PDSN 316 sends a foreign agent advertisement that includes a challenge value to the access terminal, and the access terminal responds with a mobile-IP registration request (MIP RRQ), including a response to the challenge, which the PDSN forwards to HA 322. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based. Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 3. To acquire packet data connectivity under IS-856, after an access terminal first detects an IS-856 carrier, the access terminal 302 sends to its BSC (or RNC) 306-1 a UATI (Universal Access Terminal Identifier) request, and receives in response an UATI, which the access terminal can then use to identify itself in subsequent communications with the BSC. The access terminal then sends a connection-request to the BSC 306-1, and the BSC responsively invokes a process to authenticate the access terminal and to have the access terminal acquire a data link.

In particular, the BSC 306-1 sends an access request to an Access Network AAA (ANAAA) server (which may be different than the AAA server 320), and the ANAAA server authenticates the access terminal. The BSC 306-1 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC 306-1 signals to the PDSN 316 (via PCF 314), and the PDSN and access terminal then negotiate to establish a PPP data link. In addition, as in the IS-2000 process, the access terminal then sends an MIP RRQ to the PDSN, which the PDSN forwards to the HA 322, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. SPATIAL AND TEMPORAL CONSISTENCY OF CODEC ACROSS A COMMUNICATION SESSION

When a communication session, such as a voice call, is set up with an access terminal operating in a wireless communication system, a forward link from the base station to the access terminal, and a reverse link from the access terminal to the base station, is established on an air interface between the access terminal and the base station. For a voice call, in particular, a voice encoder and encoding rate may be selected by the base station (or other RAN element) for each of the forward link and the reverse link. Higher encoding rates may provide higher quality but also transmit at higher power, while lower encoding rates may provide lower quality, but also transmit at lower power. Since forward and reverse link transmissions can contribute to RF interference in a sector (and possibly neighboring sectors), RF interference in a sector will tend to increase with the number of access terminals engaging in communications (e.g., capacity loading), and with the respective transmission power levels on their respective forward and reverse links. Accordingly, selection of the voice encoder may be based, at least in part, on RF conditions and/or capacity loading conditions in the cell or sector (or other form of wireless coverage zone) in which the access terminal is operating when the voice call is set up.

More particularly, under CDMA2000 1X, codec support may be specified according to the EVRC-B standard for voice codecs. As described above EVRC-B defines eight different encoding rates, each identified according to different COP parameter value. Table 1 lists the COP parameters values (first column) and corresponding channel encoding rates (second column), source encoding rates (third column), and average data rates (fourth column). The average data rates include bits for silence intervals.

TABLE 1

| COP | Channel Rate (kbps) | Source Rate (kbps) | Average Rate (kbps) |
|---|---|---|---|
| 0 | 9.3 | 8.3 | 6.93 |
| 1 | 8.5 | 7.57 | 6.42 |
| 2 | 7.5 | 6.64 | 5.52 |
| 3 | 7.0 | 6.18 | 5.24 |
| 4 | 6.6 | 5.82 | 4.82 |
| 5 | 6.2 | 5.45 | 4.62 |
| 6 | 5.8 | 5.08 | 4.45 |
| 7 | 4.8 | 4.0 | 3.75 |

As can be seen, lower COP values correspond to higher data rates, and vice versa. Generally, COPs 0-3 specify encoding rates that yield the highest voice quality, but requires the highest transmission powers. COP 4 specifies encoding rate that yield voice quality comparable to EVRC, but requires slightly lower transmission power than EVRC, while COPs 5-7 specify encoding rates that yield the lower voice quality than EVRC, but requires even lower transmission powers.

Under EVRC-B, the base station may select one of the COP values when a voice call is set up, and instruct the access terminal to use that value on its forward and reverse links. The access terminal may then use the corresponding encoding rate on its forward and reverse links. It is also possible for the access terminal to change COP values, and corresponding reverse-link encoding rates, during the course of a voice call, for example as the access terminal hands off to different sectors or cells. In practice, however, a change in voice quality as COP values change can be perceived by the user as distracting and/or annoying. Consequently, a fixed COP value is typically selected for the duration of a voice call.

A voice call (or other type of communication session) is typically carried on a communicative connection that includes the access terminal's forward and reverse links at the "near end" of the call, an end link with a client communication device or a server at the "far end" of the call, and one or more network (or other) links in between. In conventional operation, however, the fixed COP value is selected by the base station of the particular cell or sector in which the access terminal is operating when the call is set up, based (at least in part) on capacity utilization only in the particular cell or sector, as described above. Selection in this manner can therefore fail to account for link capacity variations associated with different segments of the communicative connection, different air interfaces of the access terminal due to handoff during the call, or both. As a result, resources committed to the access terminal's air interface, in correspondence with the fixed COP value, may be not accommodate the capacity variations that may be encountered during a call. Accordingly, it would be desirable to select a COP value for a call, and more generally, an encoder rate for a communication session, in such a manner that takes account of capacity variations across the call (or communication session).

Capacity variations that result from differing capacity of different links of a communication session or call are referred to herein as "spatial" variations, since each link may be considered as delineating a spatial segment of the communicative connection that carries the call or session. Capacity variations that result from the access terminal handing off to different cells or sectors (or other forms of wireless coverage zones) during the communication session or call are referred to herein as "temporal" variations, since handoffs (and the corresponding possible changes in forward and/or reverse link capacities that result) may be considered as events during the timeline of the call or session. Accordingly, maintaining codec consistency across a communication session or call may help ensure spatial consistency and/or temporal consistency.

a. Spatial Consistency

In accordance with example embodiments, the end link at the far end of a communicative connection may be determined when a call or communication is being set up. In doing so, the base station (or other RAN device) at the near end may determine the capacity or transmission rate (or rates) supported by the end link, and select coding rate for the air interface that is matched or comparable. In particular, for a voice call, the base station can base its selection (at least in part) of a COP parameter value (or more generally, encoder rate) on whether the end link is a wireline connection to a landline telephone, or an air-interface link with another (far-end) access terminal. The base station can further take into account capacity utilization in the cell or sector in which the near-end access terminal is operating. Moreover, separate account may be taken of the access terminals forward and reverse links, in respective correspondence with a down-link to a far-end client device and an up-link from the far-end client device (where the down-link and the up-link together correspond to the end link).

Two communicative connections that illustrate two example calls are depicted in FIG. 3. Specifically, a first communicative connection 311 is shown between access terminals 302 and 326, and a second communicative connection 313 is shown between access terminal 326 and landline telephone 328. Note that the illustration is not necessarily intended to indicate that both communicative connections 311 and 313 (or the respective calls they carry) are concurrent.

Taking access terminal 302 to be the near end of the call and access terminal 326 to be far end, the end link is the air interface 327. Spatial consistency of the codec used on the call may be achieved by comparing the COPs parameters determined conventionally for each of air interface 303 and 327, and selecting the maximum value of the two. This would help ensure that the near-end access terminal 302 did not use more transmission capacity on its reverse link than could be accommodated on the far-end forward link of air interface 327. Additionally or alternatively, the respective transmission capacities on the forward links of the air interfaces 303 and 327 could be similarly compared in selecting the COPs parameter for these links.

More particularly, if the conventionally-determined COP value of the air interface 303 were smaller than that of the air interface 327, then selection of the conventionally-determined value could result in wasted capacity (and potentially unnecessary excess RF interference) on the air interface 303. In this case, selecting instead the larger conventionally-determined COP value of the far-end air interface could help avoid this wasted capacity. Conversely, if the conventionally-determined COP value of the air interface 303 were larger than that of the air interface 327, then selecting the conventionally-determined value could similarly help avoid this wasted capacity, at least on the near-end air interface 303. Further, if the conventionally-determined COP value of the air interface 303 were larger than that of the air interface 327, and RF conditions in the cell or sector of the near-end access terminal 302 were above a threshold quality level, then the base station (e.g., BSC 306-1) or other RAN device could possibly select a lower COP value, thereby possibly improving the call quality.

Referring again to the communicative connection 313 in FIG. 3, and this time taking access terminal 326 to be the near end of the call and landline telephone 328 to be far end, the end link is the (wireline) end link 329. Note that a wireline connection to a landline phone could include a wireline connection to a residential base-station device of a cordless telephone. Spatial consistency of the codec used on the call may be achieved by comparing the COP parameter determined conventionally for air interface 327 with the transmission rate supported on end link 329, and possibly adjusting the conventionally-determined COP value to reasonably match the end-link transmission rate. This would again help ensure that the near-end access terminal 326 did not use more transmission capacity on its air interface 327 than could be accommodated on the end link 329. But it could also enable the access terminal to take advantage of an increased coding rate capable of being transmitted on the wireline end link 329. A "reasonable" match could correspond to selecting a COP parameter that is as close as possible to a coding rate for the end link 329, but that does not correspond to an coding rate that exceeds the conventionally-determined value by greater than a threshold amount.

More particularly, since a landline connection, such as the end link 329, typically can support a sustained transmission rate, and may be relatively immune to noise or loading variability, the base station (e.g., BSC 306-1) or other RAN device could possibly select a lower COPs value for the near-end air interface 326. This could be the case, for example, if a trend for capacity loading in the cell or sector of the access terminal 326 were predicted to increase at no greater than a threshold rate. Such a below-threshold loading-increase rate could indicate that the base station could safely allow the access terminal 326 to transmit at a higher power level on its reverse link than that corresponding to the conventionally-determined COPs value. Similarly, the base station might be able to safely transmit to the access terminal 326 at a higher power level on its forward link than that corresponding to the conventionally-determined COPs value. Thus, the base station could instruct the access terminal to use a lower COPs value. On the other hand, if the trend for capacity loading in the cell or sector of the access terminal 326 were predicted to increase at greater than the threshold rate, then the base station could simply select the conventionally-determined COPs value, and instruct the access terminal 326 accordingly.

By way of example, the trend for capacity loading in a cell or sector (or other form of wireless coverage zone) could be determined by the base station (or other RAN device) according a procedure for monitoring capacity loading as a function of time. A monitoring procedure could include determination of a running time average of utilization metrics, such as noise, interference, number of active calls, etc. One or more of such time averages could then be used to predict individual or combined trends. In addition, historical trends could also be used in conjunction with real-time monitoring to determine a trend for capacity loading. A threshold rate for an increase in the determined trend could be set to various values. For instance, a value of zero would imply that any positive increase would exceed the threshold; a negative value would further imply that the trend would have to decrease faster than the threshold to remain below the threshold. A positive value would allow a sufficiently small positive increase to remain below threshold. The threshold value could be specified as a fractional or percentage increase per unit time. For example, the threshold rate could be 0.2% per minute. Other values could be specified as well.

As described above in connection with FIG. 1, selection of a COP value to maintain spatial consistency of a codec across a call can be generalized to apply to correspondence between the air interface and the end link in terms of transmission rates. That is, selection of encoding rates need not be made only according to discretely-numbered parameter labels.

b. Temporal Consistency

In accordance with example embodiments, the base station (or other RAN device) may probabilistically determine that there is greater than threshold likelihood that the access terminal will hand off to one or more additional cells or sectors during the course of a call, besides the one in which the access terminal is operating when a call (or communication session) is set up. Based on such a probabilistic determination, the base station may then conventionally determine COP values for each of the cells or sectors that the access terminal may be predicted to visit during the call, and may select a value from among the conventionally-determine COP values that helps achieve temporal consistency of the encoding rate in a way that accounts for variations in capacity loading may be encountered during the call.

An example of traversal of multiple sectors by an access terminal is illustrated in FIG. 4, in which a different identifier is used to label each of a starting and ending location. As shown, an access terminal may be predicted to move approximately along a path 403 from sector "C" of the BTS 404-1 to sector "A" of the BTS 404-3. The starting position marked with an access terminal 402a; the ending position is marked with the same access terminal, but labeled 402b. In the illustrated example, the path 403 crosses sector "A" of BTS 404-1, sector "A" of BTS 404-2, and sector "B" of BTS 404-2, in addition to the starting and ending positions. The capacity loading in each of the traversed sectors could be different, so that a different conventionally-determined COP value might be determined for each. While the illustration may make it appear as if the access terminal does, in fact, traverse the path 403, in the context of example embodiments, the sectors crossed by the path may be ones that are predicted when the call is set up as likely to be traversed by the access terminal during the call.

More particularly, when a call or communication session is requested for the access terminal 402(a/b) while it is operating in "C" of the BTS 404-1, the base station (e.g., BSC 406) could access or consult historical call data for the access terminal 402(a/b) to determine a likelihood that it will hand-off to one or more other sectors during the course of the call. By way of example, the historical data could include call detail records (CDRs) in an account of a subscriber or user associated with the access terminal 402(a/b). By analyzing CDRs, for example, the base station could recognize that a particular call request coincides with a historical pattern of calls for the access terminal. For instance, the subscriber associated with the access terminal might place a particular call to a particular party at roughly the same time and from roughly the same location (sector) each weekday, and the traverse roughly the same sectors during the course of the historically-identified call. This information could be used to determine that a new call request from the subscriber is likely to fit the pattern of the historically-identified call. The base station may thereby determine probabilistically that the access terminal associated with the subscriber will traverse one or more particular sectors during the course of the newly-requested call.

CDRs (or other form of historical call and/or session data) could be stored in one or more servers of a wireless communication system. For example, a wireless communication system could include servers for storage and/or processing of accounting data (e.g. account data of subscribers and/or users). Storage could be in the form of magnetic disks, solid state disks, optical media, or other forms of computer-readable media. The RAN device (e.g., base station) could access CDRs via a communicative connection to the accounting servers, for example.

This is just one example of how CDRs might be used to predict sectors to which an access terminal may hand off during a call. There could be others as well. In each case, a prediction could include a likelihood of handoff to each of one or more sectors that could be compared with a threshold likelihood. The base station (or other RAN device) could assemble a list or table of all such sectors for which the determined likelihood exceeds the threshold. The sectors (or cells, for example) in the list could then represent the sectors to which the access terminal may be predicted to handoff during the course of the call.

In accordance with example embodiments, the base station could then make a conventional determination of the COP value that would be assigned to the access terminal in each of the listed sectors if the call were to be requested while the access terminal was operating in that sector. Assuming the list includes more than one sector, this would yield more than one COP value. The base station could then select a COP value that provides a consistent call quality over the duration of the call. Again, selection of a COP value in this manner could be made separately on the forward and reverse links.

The selection could be made in a variety of ways. For example, the base station could select the smallest COP value. This would give the highest voice quality, but could possibly increase load and/or RF interference in those sectors on the list with higher conventionally-determined COP values, assuming the access terminal did, in fact, traverse those sectors during the call. Alternative, the base station could select the highest COP value. This would give a lower voice quality, but could help ensure that none of the sectors on the list would see an increase in load and/or RF interference beyond what would have been conventionally expected. As an additional possibility, the base station could select a COP value corresponding to an average of the encoder rates associated with the COP values of the list. Once the COP value is selected from the list, the base station could then instruct the access terminal to use the selected COP value for the duration of the call.

Figure 5:
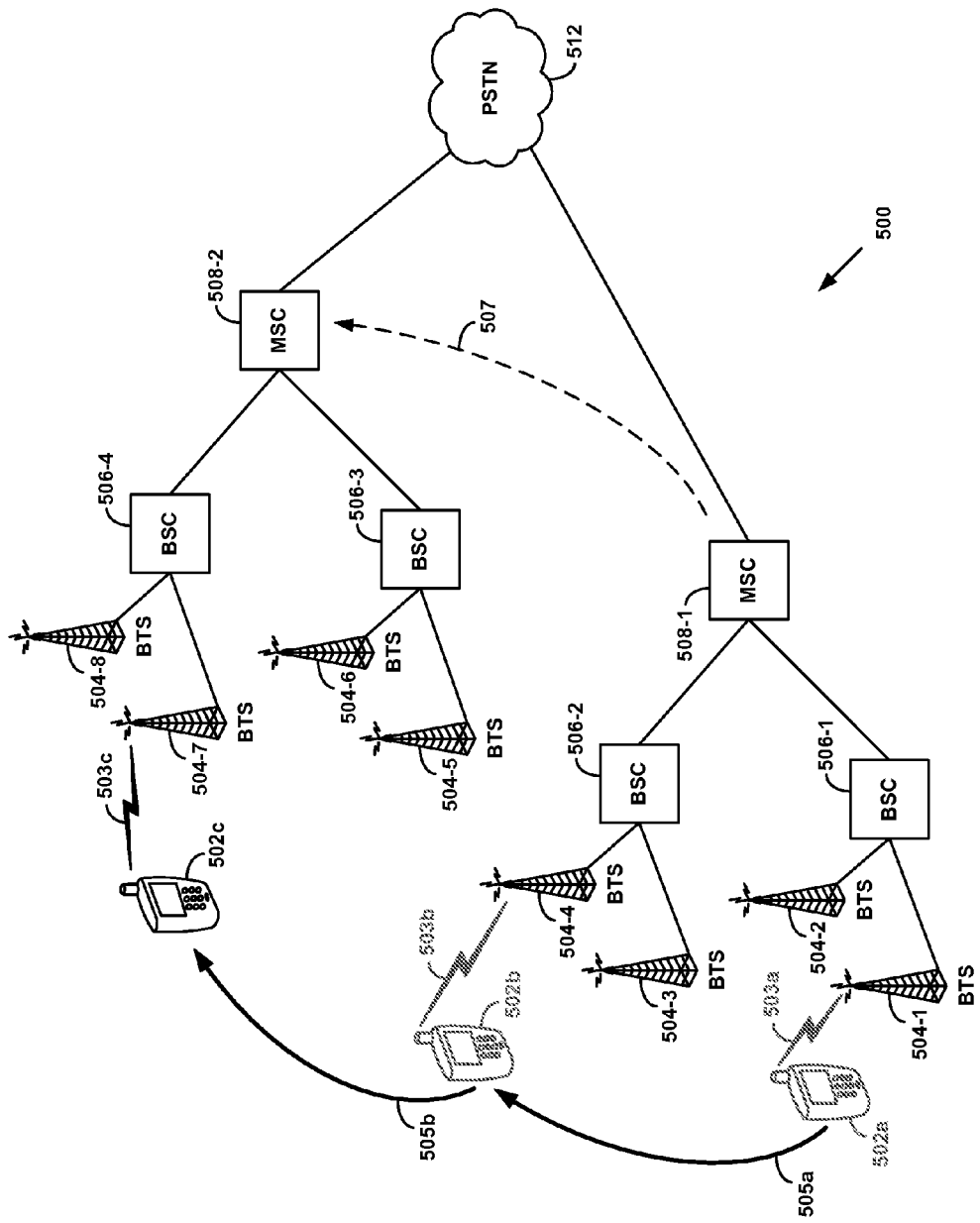
FIG. 5 illustrates a second example of operation of maintaining codec consistency across a communication session in a wireless communication system, in accordance with example embodiments.

FIG. 5 illustrates another example of traversal of multiple sectors by an access terminal in a wireless communication network 500 in which example of operation of maintaining codec consistency across a communication session could be implemented. Network 500 depicts an example hierarchical topology including, from top to bottom, two MSCs 508-(1,2), four BSCs 506-(1,2,3,4), and eight BTSs 504-(1,2,3,4,5,6,7, 8). As illustrated, BSCs 506-(1,2) are under MSC 508-1 and BSCs 506-(3,4) are under MSC 508-2. The BSC-BTS hierarchy includes BTS 504-(1,2) under BSC 506-1, BTS 504-(3,4) under BSC 506-2, BTS 504-(5,6) under BSC 506-3, and BTS 504-(7,8) under BSC 506-4. Both MSCs are also shown as connected to PSTN 512. For the sake of brevity in FIG. 5, no packet-data network or related network entities (e.g., PDSNs) are shown. This omission in the illustration of FIG. 5 should not be taken as limiting with respect to embodiments presented herein.

By way of example, FIG. 5 also includes access terminal 502, depicted at three predicted positions as AT 502*a* AT 502*b*, and AT 502*c*, which represent different predicted handoff locations. At the predicted handoff location, AT 502*a* (shown in gray) will be connected to BTS 504-1 via air traffic channel 503*a* (also shown in gray). At the predicted handoff location, AT 502*b* will be connected to BTS 504-4 via air traffic channel 503*b*. At the predicted handoff location, AT 502*c* will be connected to BTS 504-7 via air traffic channel 503*c*. The predicted movement of the access terminal across these locations is represented by curved arrows 505*a* and 505*b*. According to the topology of network 500, the predicted movement of the access terminal will result in a change of BTS, BSC, and MSC. Consequently, the communication session with AT 502 will be handed off from MSC 508-1 to MSC 508-2. This predicted handoff is represented by curved, dashed arrow 507.

In the example illustrated in FIG. 5, a RAN device, such as BSC 506-1 could determine predicted handoffs according to the CDR approach described above, for example, in response to a request to set up a call with the AT 502*a* (i.e., while the AT 502 is operating in a sector of BTS 504-1). The RAN device could then conventionally determine a COP value for each of the air interfaces 503*a*, 503*b*, and 503*c*. Finally, the RAN device could select one of the three COP values according to one of the selection schemes also described above.

c. Example RAN Device

Figure 6:
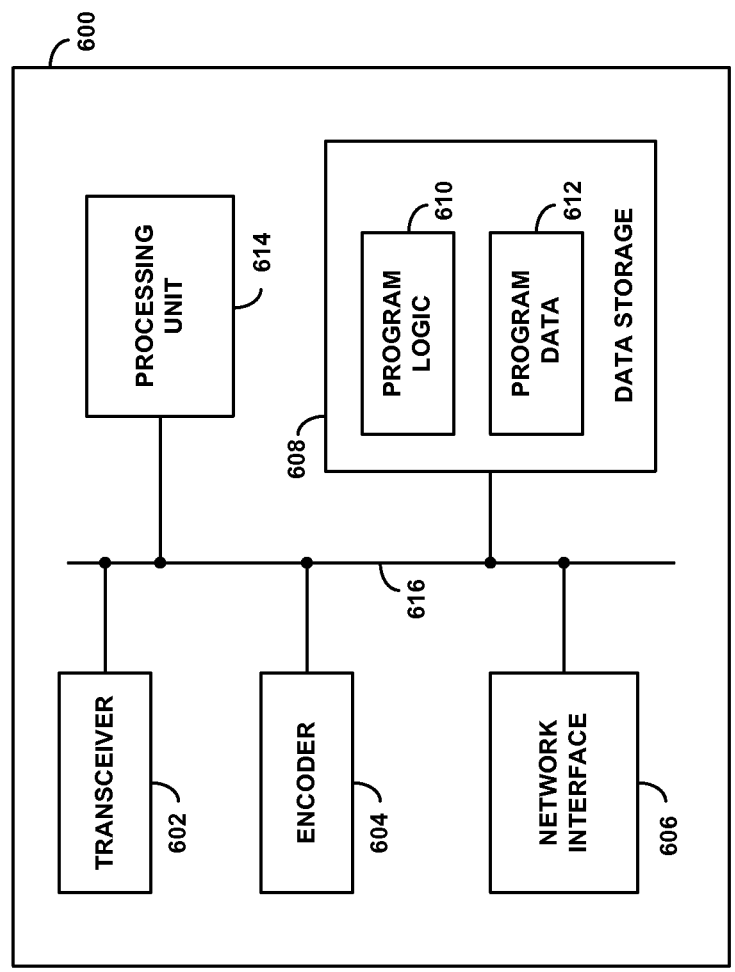
FIG. 6 is a block diagram of an example RAN device in which an example method of maintaining codec consistency across a communication session could be implemented.

The example embodiments of maintaining codec consistency across a communication session described above can be implemented as methods in a RAN device, such as a BSC, RNC, base station, or MSC, for example. The discussions above of FIGS. 1 and 2 provide examples of such methods. FIG. 6 is a block diagram depicting functional components of an example RAN device in which example methods of maintaining codec consistency across a communication session could be implemented. As shown in FIG. 6, the RAN device 600, representative of BSC 306-1 or 306-2, or BSC 306-1 integrated with BTS 304-1 or BSC 306-2 integrated with BTS 304-2, in FIG. 3, for instance, includes a transceiver 602, a encoder 604, network interface 606, a processing unit 614, and data storage 608, all of which may be coupled together by a system bus 616 or other mechanism. In addition, the RAN device may also include external storage, such as magnetic or optical disk storage, although this is not shown in FIG. 6.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein.

Network interface 606 enables communication on a network, such network 300. As such, network interface 606 may take the form of trunk or optical link that can be coupled with one or more other a TDM switches (e.g., other MSCs or trunk switches) such as MSC 308-1 or 308-2. The network interface 606 could also take the form of an Ethernet network interface card or other physical connection, among other possibilities, for connection to a packet device, such as PCF 314, for instance. Further, network interface 606 in combination with encoder 604 and transceiver 602, which may include one or more BTS antennas, enables air interface communication with one or more access terminals on air-interface forward and reverse links, thereby supporting methods of maintaining codec consistency across a communication session described herein.

Processing unit 614 comprises one or more general-purpose processors (e.g., INTEL microprocessors) and/or one or more special-purpose processors (e.g., dedicated digital signal processor, application specific integrated circuit, etc.). In turn, the data storage 608 comprises one or more volatile and/or non-volatile storage components, such as magnetic or optical memory or disk storage. Data storage 608 can be integrated in whole or in part with processing unit 614, as cache memory or registers for instance. As further shown, data storage 608 is equipped to hold program logic 610 and program data 612.

Program logic 610 may comprise machine language instructions that define routines executable by processing unit 614 to carry out various functions described herein. In particular the program logic, communication interface, and encoder may operate cooperatively to carry out logical operation such as that discussed above. Further, program data 612 may be arranged to store data used in conjunction with the logical operations described above.

It will be appreciated that there can be numerous specific implementations of a network switch, such as RAN device 600, in which a method of maintaining codec consistency across a communication session could be implemented. Further, one of skill in the art would understand how to devise and build such an implementation. As such, RAN device 600 is representative of means for carrying out maintaining codec consistency across a communication session, in accordance with the functions and steps described herein by way of example.

As described above in connection with FIG. 1, selection of a COP value to maintain spatial consistency of a codec across a call can be generalized to apply directly to transmission rates reverse links of predicted handoff sectors. That is, selection of encoding rates need not be made only according to discretely-numbered parameter labels. For example, the RAN device could determine air-interface transmission rates supported in each predicted handoff sector. A rate for the call could then be selected directly from among the determined supported rates.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a radio access network (RAN) device of a wireless communication system, a method comprising:
    receiving a request to set up a new communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone;
    predicting during set-up of the newly-requested communication session that there is greater than a threshold likelihood that the communicative connection will also include a respective additional air interface in each of at least one additional wireless coverage zone of a wireless communication network during the course of the newly-requested communication session;
    during set-up of the newly-requested communication session, determining a respective transmission rate supported by the respective additional air interface in each of the at least one additional wireless coverage zones based on capacity load conditions in each of the at least one additional wireless coverage zones;
    during set-up of the newly-requested communication session, determining an air-interface transmission rate supported by the particular air interface in the particular wireless coverage zone based on capacity load conditions in the particular wireless coverage zone;
    selecting a coding rate for the particular air interface based on a comparison of the determined respective transmission rates and the air-interface transmission rate supported by the particular air interface; and
    transmitting an instruction to the access terminal to use the selected coding rate for air-interface communications for a duration of the newly-requested communication session,
    wherein selecting the coding rate for the particular air interface based on the comparison of the determined respective transmission rates and the air-interface transmission rate supported by the particular air interface comprises:
    determining a minimum rate value from among the determined air-interface transmission rate and the determined respective transmission rates;
    from among the determined air-interface transmission rate and the determined respective transmission rates, determining a particular rate value that is a maximum of a set of all rate values that are each no greater than a given threshold above the determined minimum rate value; and
    selecting the coding rate to correspond to the determined particular rate value.

2. The method of claim 1, wherein determining the respective transmission rate supported by the respective additional air interface in each of the at least one additional wireless coverage zones comprises determining a respective reverse-link transmission rate supported by the respective additional air interface in each of the at least one additional wireless coverage zones,
    wherein selecting the coding rate for the particular air interface based on the comparison of the determined respective transmission rates and the air-interface transmission rate supported by the particular air interface further comprises selecting an encoding rate for the particular reverse link based on a comparison of the determined respective reverse-link transmission rates a reverse-link transmission rate supported by the particular reverse link,
    and wherein transmitting the instruction to the access terminal to use the selected coding rate for air-interface communications comprises transmitting an instruction to the access terminal to use the selected encoding rate for communications on the particular reverse link.

3. The method of claim 1, wherein determining the respective transmission rate supported by the respective additional air interface in each of the at least one additional wireless coverage zones comprises determining a respective forward-link transmission rate supported by the respective additional air interface in each of the at least one additional wireless coverage zones,
    wherein selecting the coding rate for the particular air interface based on the comparison of the determined respective transmission rates and the air-interface transmission rate supported by the particular air interface further comprises selecting decoding rate for the particular forward link based on a comparison of the determined respective forward-link transmission rates a forward-link transmission rate supported by the particular forward link,
    and wherein transmitting the instruction to the access terminal to use the selected coding rate for air-interface communications comprises transmitting an instruction to the access terminal to use the selected decoding rate for communications on the particular forward link.

4. The method of claim 1, wherein predicting during set-up of the newly-requested communication session that there is greater than the threshold likelihood that the communicative connection will also include the respective additional air interface in each of the at least one additional wireless coverage zones of a wireless communication network during the course of the newly-requested communication session comprises:

analyzing historical records of previous communication sessions of the access terminal to probabilistically determine a set of one or more wireless coverage zones, besides the particular wireless coverage zone, to which the access terminal is predicted to handoff during the newly-requested communication session.

5. The method of claim 1, wherein the newly-requested communication session is a voice call, and wherein determining the respective transmission rate supported by the respective additional air interface in each of the at least one additional wireless coverage zones comprises determining a voice codec and encoding rate that will be used on the respective additional air interface in each of the at least one additional wireless coverage zones during the voice call.

6. The method of claim 5, wherein determining the voice codec and encoding rate that will be used on the respective additional air interface in each of the at least one additional wireless coverage zones during the voice call comprises determining a quality level of radio-frequency (RF) operating conditions in each of the at least one additional wireless coverage zones.

7. The method of claim 1, wherein determining the air-interface transmission rate supported by the particular air interface comprises determining a quality level of radio-frequency (RF) operating conditions in the particular wireless coverage zone.

8. The method of claim 1, wherein selecting the coding rate to correspond to the determined particular rate value comprises selecting from among a plurality of predefined coding rates a particular coding rate that most closely corresponds to the determined particular rate value.

9. The method of claim 1, wherein the newly-requested communication session is a voice call, wherein the wireless communication system is configured to operate according to at least EVRC-B, including assignment of air-interface coding rates according to predefined Capacity Operating Point (COP) parameter values ranging from a minimum COPs value to a maximum COPs value, wherein the particular wireless coverage zone of the wireless communication system is a particular wireless sector of the wireless communication system, wherein each of the at least one additional wireless coverage zones of the wireless communication network is a respective wireless sector of the wireless communication network, and wherein selecting the coding rate for the particular air interface based on the comparison of the determined respective transmission rates and the air-interface transmission rate supported by the particular air interface further comprises:

determining a default COP parameter value for the particular air interface based on capacity load conditions in the particular wireless sector and according to EVRC-B;

determining a respective COP parameter value for the respective additional air interface in each of the at least one additional wireless coverage zones; and selecting a COP parameter value that is a maximum from among the determined default COP parameter value and the determined respective COP parameter values.

10. The method of claim 9, wherein predicting during set-up of the newly-requested communication session that there is greater than the threshold likelihood that the communicative connection will also include the respective additional air-interface reverse link from the access terminal in each of the at least one additional wireless coverage zones of a wireless communication network during the course of the newly-requested communication session comprises:

analyzing historical records of previous voice calls of the access terminal to probabilistically determine a set of one or more wireless sectors, besides the particular wireless sector, to which the access terminal is predicted to handoff during the voice call.

11. A radio access network (RAN) device of a wireless communication system comprising: one or more processors; memory accessible by the one or more processors; and computer-readable instructions stored in the memory that upon execution by the one or more processors cause the RAN device to carry out functions including:

receiving a request to set up a new communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone, predicting during set-up of the newly-requested communication session that there is greater than a threshold likelihood that the communicative connection will also include a respective additional air interface in each of at least one additional wireless coverage zone of a wireless communication network during the course of the newly-requested communication session, during set-up of the newly-requested communication session, determining a respective transmission rate supported by the respective additional air interface in each of the at least one additional wireless coverage zones based on capacity load conditions in each of the at least one additional wireless coverage zones, during set-up of the newly-requested communication session, determining an air-interface transmission rate supported by the particular air interface in the particular wireless coverage zone based on capacity load conditions in the particular wireless coverage zone, selecting a coding rate for the particular air interface based on a comparison of the determined respective transmission rates and the air-interface transmission rate supported by the particular air interface, and transmitting an instruction to the access terminal to use the selected coding rate for air-interface communications for a duration of the newly-requested communication session, wherein selecting the coding rate for the particular air interface based on the comparison of the determined respective transmission rates and the air-interface transmission rate supported by the particular air interface comprises:

determining a minimum rate value from among the determined air-interface transmission rate and the determined respective transmission rates;

from among the determined air-interface transmission rate and the determined respective transmission rates, determining a particular rate value that is a maximum of a set of all rate values that are each no greater than a given threshold above the determined minimum rate value; and selecting the coding rate to correspond to the determined particular rate value.

12. The RAN device of claim 11, wherein determining the respective transmission rate supported by the respective additional air interface in each of the at least one additional wireless coverage zones comprises determining a respective reverse-link transmission rate supported by the respective additional air interface in each of the at least one additional wireless coverage zones, wherein selecting the coding rate for the particular air interface based on the comparison of the determined respective transmission rates and the air-interface transmission rate supported by the particular air interface further comprises selecting an encoding rate for the particular reverse link based on a comparison of the determined respective reverse-link transmission rates a reverse-link transmission rate supported by the particular reverse link, and wherein transmitting the instruction to the access terminal to use the selected coding rate for air-interface communications comprises transmitting an instruction to the access terminal to use the selected encoding rate for communications on the particular reverse link.

13. The RAN device of claim 11, wherein determining the respective transmission rate supported by the respective additional air interface in each of the at least one additional wireless coverage zones comprises determining a respective forward-link transmission rate supported by the respective additional air interface in each of the at least one additional wireless coverage zones, wherein selecting the coding rate for the particular air interface based on the comparison of the determined respective transmission rates and the air-interface transmission rate supported by the particular air interface further comprises selecting decoding rate for the particular forward link based on a comparison of the determined respective forward-link transmission rates a forward-link transmission rate supported by the particular forward link, and wherein transmitting the instruction to the access terminal to use the selected coding rate for air-interface communications comprises transmitting an instruction to the access terminal to use the selected decoding rate for communications on the particular forward link.

14. The RAN device of claim 11, wherein predicting during set-up of the newly-requested communication session that there is greater than the threshold likelihood that the communicative connection will also include the respective additional air interface in each of the at least one additional wireless coverage zones of a wireless communication network during the course of the newly-requested communication session comprises:

analyzing historical records of previous communication sessions of the access terminal to probabilistically determine a set of one or more wireless coverage zones, besides the particular wireless coverage zone, to which the access terminal is predicted to handoff during the communication newly-requested session.

15. The RAN device of claim 11, wherein the newly-requested communication session is a voice call, and wherein determining the respective transmission rate supported by the respective additional air interface in each of the at least one additional wireless coverage zones comprises determining a voice codec and encoding rate that will be used on the respective additional air interface in each of the at least one additional wireless coverage zones during the voice call.

16. The RAN device of claim 15, wherein determining the voice codec and encoding rate that will be used on the respective additional air interface in each of the at least one additional wireless coverage zones during the voice call comprises determining a quality level of radio-frequency (RF) operating conditions in each of the at least one additional wireless coverage zones.

17. The RAN device of claim 11, wherein selecting the coding rate to correspond to the determined particular rate value comprises selecting from among a plurality of predefined coding rates a particular coding rate that most closely corresponds to the determined particular rate value.

18. The RAN device of claim 11, wherein the newly-requested communication session is a voice call, wherein the wireless communication system is configured to operate according to at least EVRC-B, including assignment of air-interface coding rates according to predefined Capacity Operating Point (COP) parameter values ranging from a minimum COPs value to a maximum COPs value, wherein the particular wireless coverage zone of the wireless communication system is a particular wireless sector of the wireless communication system, wherein each of the at least one additional wireless coverage zones of the wireless communication network is a respective wireless sector of the wireless communication network, and wherein selecting the coding rate for the particular air interface based on the comparison of the determined respective transmission rates and the air-interface transmission rate supported by the particular air interface further comprises:

determining a default COP parameter value for the particular air interface based on capacity load conditions in the particular wireless sector and according to EVRC-B;

determining a respective COP parameter value for the respective additional air interface in each of the at least one additional wireless coverage zones; and selecting a COP parameter value that is a maximum from among the determined default COP parameter value and the determined respective COP parameter values.

19. A non-transient computer-readable medium having instructions stored thereon that, upon execution by one or more processors of a radio access network (RAN) device of a wireless communication network, cause the RAN device to carry out functions including:

receiving a request to set up a new communication session between an access terminal and a client communication device over a communicative connection including a particular air interface having a particular forward link for communications to the access terminal in a particular wireless coverage zone of the wireless communication system, and a particular reverse link for communications from the access terminal in the particular wireless coverage zone;

predicting during set-up of the newly-requested communication session that there is greater than a threshold likelihood that the communicative connection will also include a respective additional air interface in each of at least one additional wireless coverage zone of a wireless communication network during the course of the newly-requested communication session;

during set-up of the newly-requested communication session, determining a respective transmission rate supported by the respective additional air interface in each of the at least one additional wireless coverage zones based on capacity load conditions in each of the at least one additional wireless coverage zones;

during set-up of the newly-requested communication session, determining an air-interface transmission rate supported by the particular air interface the in particular wireless coverage zone based on capacity load conditions in the particular wireless coverage zone;

selecting a coding rate for the particular air interface based on a comparison of the determined respective transmission rates and an the air-interface transmission rate supported by the particular air interface; and transmitting an instruction to the access terminal to use the selected coding rate for air-interface communications for a duration of the newly-requested communication session, wherein selecting the coding rate for the particular air interface based on the comparison of the determined respective transmission rates and the air-interface transmission rate supported by the particular air interface comprises:

determining a minimum rate value from among the determined air-interface transmission rate and the determined respective transmission rates;

from among the determined air-interface transmission rate and the determined respective transmission rates, determining a particular rate value that is a maximum of a set of all rate values that are each no greater than a given threshold above the determined minimum rate value; and selecting the coding rate to correspond to the determined particular rate value.

20. The non-transient computer-readable medium of claim 19, wherein determining the respective transmission rate supported by the respective additional air interface in each of the at least one additional wireless coverage zones comprises determining a respective reverse-link transmission rate supported by the respective additional air interface in each of the at least one additional wireless coverage zones, wherein selecting the coding rate for the particular air interface based on the comparison of the determined respective transmission rates and the air-interface transmission rate supported by the particular air interface further comprises selecting an encoding rate for the particular reverse link based on a comparison of the determined respective reverse-link transmission rates a reverse-link transmission rate supported by the particular reverse link, and wherein transmitting the instruction to the access terminal to use the selected coding rate for air-interface communications comprises transmitting an instruction to the access terminal to use the selected encoding rate for communications on the particular reverse link.

21. The non-transient computer-readable medium of claim 19, wherein determining the respective transmission rate supported by the respective additional air interface in each of the at least one additional wireless coverage zones comprises determining a respective forward-link transmission rate supported by the respective additional air interface in each of the at least one additional wireless coverage zones, wherein selecting the coding rate for the particular air interface based on the comparison of the determined respective transmission rates and the air-interface transmission rate supported by the particular air interface further comprises selecting decoding rate for the particular forward link based on a comparison of the determined respective forward-link transmission rates a forward-link transmission rate supported by the particular forward link, and wherein transmitting the instruction to the access terminal to use the selected coding rate for air-interface communications comprises transmitting an instruction to the access terminal to use the selected decoding rate for communications on the particular forward link.

22. The non-transient computer-readable of claim 19, wherein predicting during set-up of the newly-requested communication session that there is greater than the threshold likelihood that the communicative connection will also include the respective additional air interface in each of the at least one additional wireless coverage zones of a wireless communication network during the course of the newly-requested communication session comprises:

analyzing historical records of previous communication sessions of the access terminal to probabilistically determine a set of one or more wireless coverage zones, besides the particular wireless coverage zone, to which the access terminal is predicted to handoff during the newly-requested communication session.

23. The non-transient computer-readable of claim 19, wherein the newly-requested communication session will be configured to be a voice call, and wherein determining the respective transmission rate supported by the respective additional air interface in each of the at least one additional wireless coverage zones comprises determining a voice codec and encoding rate that will be used on the respective additional air interface in each of the at least one additional wireless coverage zones during the voice call.

24. The non-transient computer-readable of claim 23, wherein determining the voice codec and encoding rate that will be used on the respective additional air interface in each of the at least one additional wireless coverage zones during the voice call comprises determining a quality level of radio-frequency (RF) operating conditions in each of the at least one additional wireless coverage zones.

25. The non-transient computer-readable of claim 19, wherein determining the air-interface transmission rate supported by the particular air interface comprises determining a quality level of radio-frequency (RF) operating conditions in the particular wireless coverage zone.

26. The non-transient computer-readable of claim 19, wherein selecting the coding rate to correspond to the determined particular rate value comprises selecting from among a plurality of predefined coding rates a particular coding rate that most closely corresponds to the determined particular rate value.

27. The non-transient computer-readable of claim 19, wherein the newly-requested communication session will be configured to be a voice call, wherein the wireless communication system is configured to operate according to at least EVRC-B, including assignment of air-interface coding rates according to predefined Capacity Operating Point (COP) parameter values ranging from a minimum COPs value to a maximum COPs value, wherein the particular wireless coverage zone of the wireless communication system is a particular wireless sector of the wireless communication system, wherein each of the at least one additional wireless coverage zones of the wireless communication network is a respective wireless sector of the wireless communication network, and wherein selecting the coding rate for the particular air interface based on the comparison of the determined respective transmission rates and the air-interface transmission rate supported by the particular air interface further comprises:

determining a default COP parameter value for the particular air interface based on capacity load conditions in the particular wireless sector and according to EVRC-B;

determining a respective COP parameter value for the respective additional air interface in each of the at least one additional wireless coverage zones; and selecting a COP parameter value that is a maximum from among the determined default COP parameter value and the determined respective COP parameter values.

\* \* \* \* \*